(12) United States Patent
Mellon et al.

(10) Patent No.: US 7,840,444 B2
(45) Date of Patent: Nov. 23, 2010

(54) LENS ORDERING AND DELIVERY SYSTEM FOR HEAD MOUNTED DISPLAY

(75) Inventors: Francois Mellon, Charenton-le-Pont (FR); Gilbert Menduni, Charenton-le-Pont (FR)

(73) Assignee: Essilor International Compagnie Generale d'Optique (FR)

( * ) Notice: Subject to any disclaimer, the term of this patent is extended or adjusted under 35 U.S.C. 154(b) by 995 days.

(21) Appl. No.: 11/633,949

(22) Filed: Dec. 5, 2006

(65) Prior Publication Data

US 2008/0129957 A1    Jun. 5, 2008

(51) Int. Cl.
G06Q 30/00 (2006.01)
G06F 17/30 (2006.01)

(52) U.S. Cl. .......................................... 705/26; 705/27

(58) Field of Classification Search .................. 705/26, 705/27
See application file for complete search history.

(56) References Cited

U.S. PATENT DOCUMENTS

| | | | |
|---|---|---|---|
| 4,944,585 A | 7/1990 | Mizuno | |
| 4,958,280 A | 9/1990 | Pauly et al. | |
| 5,485,399 A | 1/1996 | Saigo et al. | |
| 5,777,715 A * | 7/1998 | Kruegle et al. | 351/158 |
| 5,929,963 A | 7/1999 | McNeal | |
| 5,983,201 A | 11/1999 | Fay | |
| 6,058,373 A | 5/2000 | Blinn et al. | |
| 6,142,628 A | 11/2000 | Saigo | |
| 6,508,553 B2 | 1/2003 | Gao et al. | |
| 6,634,754 B2 | 10/2003 | Fukuma et al. | |
| 6,792,401 B1 | 9/2004 | Nigro et al. | |
| 7,010,146 B2 | 3/2006 | Fukuma et al. | |
| 7,016,824 B2 | 3/2006 | Waupotitsch et al. | |
| 7,054,836 B2 | 5/2006 | Christensen et al. | |
| 7,188,082 B2 | 3/2007 | Keane et al. | |
| 7,222,091 B2 | 5/2007 | Yoshida | |
| 2001/0023413 A1* | 9/2001 | Fukuma et al. | 705/27 |

(Continued)

FOREIGN PATENT DOCUMENTS

EP    1355250 A2    10/2003

(Continued)

OTHER PUBLICATIONS

"Stereo Microscope Expands Pupils" Electronics Weekly, p. 28; Apr. 18, 2001.*

(Continued)

*Primary Examiner*—Jeffrey A Smith
*Assistant Examiner*—Resha Desai
(74) *Attorney, Agent, or Firm*—Keusey & Associates, P.C.

(57) ABSTRACT

A method for ordering a corrective clip having corrective lenses. The clip corrects a wearer's view of a head mounted video display. When customers purchase an HMD, they are provided with clip ordering information. This includes information allowing the users to determine if a clip is required for their personal use. By providing at least SV and PD data customers can place their own orders which are transmitted to the lab. The completed corrective clip is delivered directly to the customer. Since the clip mounts on the viewer, a fitting session is not required. In use, the corrective clip reside between the user's eyes and an HMD display, without contacting the user.

10 Claims, 2 Drawing Sheets

U.S. PATENT DOCUMENTS

| | | | |
|---|---|---|---|
| 2001/0042028 A1* | 11/2001 | Yoshida | 705/27 |
| 2002/0029408 A1* | 3/2002 | Lindahl | 2/426 |
| 2002/0143653 A1 | 10/2002 | Dilena et al. | |
| 2004/0051846 A1* | 3/2004 | Blum et al. | 351/168 |
| 2004/0215525 A1* | 10/2004 | Keane et al. | 705/26 |
| 2004/0240072 A1 | 12/2004 | Schindler et al. | |

FOREIGN PATENT DOCUMENTS

| | | |
|---|---|---|
| EP | 1515179 A1 | 3/2005 |
| JP | 2002133219 | 5/2002 |
| WO | WO 03/005170 | 1/2003 |
| WO | 2005043220 A2 | 5/2005 |

OTHER PUBLICATIONS

U.S. Appl. No. 10/802,960 A1, filed Dec. 2, 2004, Schindler et al.

Patent Cooperation Treaty International Search Report, Dec. 2, 2009, 5 pages.

FRAMESDIRECT.COM; http://www.framesdirect.com; 2006; 2 pages.

MYVU.COM; http://www.myvu.com; 2006; 3 pages.

NIKE.COM; http://www.nike.com; 2006; 1 page.

CAFEPRESS.COM; http://www.cafepress.com; 2006; 2 pages.

* cited by examiner

LENS ORDERING AND DELIVERY SYSTEM FOR HEAD MOUNTED DISPLAY

BACKGROUND OF THE INVENTION

1. Technical Field

The present invention relates generally to a method for ordering corrective lenses, and particularly, to a method of ordering a corrective clip having corrective lenses, the corrective clip being adapted for use in a head mounted display (HMD).

2. Description of Prior Art

U.S. patent application Ser. No. 11/523,709, entitled "Lens Holding Frame", filed on Sep. 20, 2006, in the name of Essilor International Compagnie Generale d'Optique, describes the design and fitting of a specially designed clip with a set of corrective lenses mounted therein for attachment to a HMD, the entire contents of which is herein incorporated by reference thereto.

PCT Publication No. WO 03/005170, to Keane, et al, describes a computer user interface suitable for ordering lens products from vendors. The user interface displays to an operator lists of options, with selections of options from a list decreasing the subsequent available options available in subsequent lists.

U.S. Pat. No. 7,016,824, to Waupotitsch, et al, describes an interactive platform for representing eyeglass frames on a representation of a consumer. In particular, this patent describes creating a 3D model of the eyeglass frames and a 3D model of the user's face, and using both, displays to a user how a particular set of eyeglass frames would look on their face. The FramesDirect.com website provides similar features, but requires Rx confirmation.

U.S. Pat. No. 6,792,401, to Nigro, et al, discloses an internet based optical imaging kiosk for gathering anthropometric data. This patent further describes using such data to take 2D and 3D imaging data of a client to build a 3D representation of a user, and to model wearable goods on the user.

U.S. Pat. No. 7,010,146, to Fukuma, et al, illustrates a database construction system for showing information on eyeglass frames. This patent further describes separating a facial picture into components and then classifying the types of facial components in order to collect data for associating facial types with selected eyeglass frames.

What is needed is a method for allowing a consumer to order a corrective clip with the assistance of an ECP. This method will preferably also enable the automatic calculation of the corrected prescription required.

SUMMARY OF THE INVENTION

Accordingly, it is an object of the present invention to enable consumers to directly order and receive custom prescription corrective clips for use with personal media viewers.

It is another object to allow consumers to determine on their own if they require a corrective clip.

It is a further object to provide consumers with an option to visit an ECP for Rx confirmation and order assistance.

It is yet another object to have the manufactured clip shipped directly to consumers.

These and other related objects are achieved by a method for ordering a corrective clip having corrective lenses, where the clip corrects a wearer's view of a head mounted video display. First, we provide corrective clip ordering information to HMD purchasers. Next, customers can direct order by providing at least one set of SV and PD data. The order is delivered to a lab capable of manufacturing the corrective clip. Once completed, the corrective clip is shipped directly to the customer.

Through various means, the customer can first determine whether a corrective clip is needed. Orders can be placed via the internet. Orders are transmitted to a lab capable of producing the corrective clip. Alternatively, one can obtain SV and PD data from an ECP and order the corrective clip through the ECP. For non-presbyopes, customer's normal single vision prescription as the prescription for the lens in the corrective clip For presbyopes, we start with the far vision, add a value based on the near vision add and adjust PD, to provide a SV lens. More specifically, the SV prescription is raised to a higher power based on the near vision add to provide a modified SV prescription. An adjusted PD is calculated and a modified and adjusted SV lens is provided in the corrective clip. PD is adjusted by multiplying the far vision PD by a factor less than 1, for example, 0.973. The far vision portion is modified by discrete averaging based on the near vision add.

Manufacturing includes edging a lens to fit into a standard clip which comprises a flexible nose bridge and arms and which omits temples. Upon receipt, the clip is adapted for mounting onto the viewer by flexing the nose bridge, and in use the clip does not contact the user. The clip is adapted to be positioned between a user's eyes and an HMD display having a virtual focus image location between 2 and 6 feet from the user's eyes.

BRIEF DESCRIPTION OF THE DRAWINGS

The advantages, nature and various additional features of the invention will appear more fully upon consideration of the illustrative embodiments now to be described in detail in connection with the accompanying drawings. In the drawings wherein like reference numerals denote similar steps and components throughout the views.

It should be understood that the drawings are for purposes of illustrating the concepts of the invention and are not necessarily the only possible configuration for illustrating the invention.

DETAILED DESCRIPTION OF PREFERRED EMBODIMENTS

Figure 1:
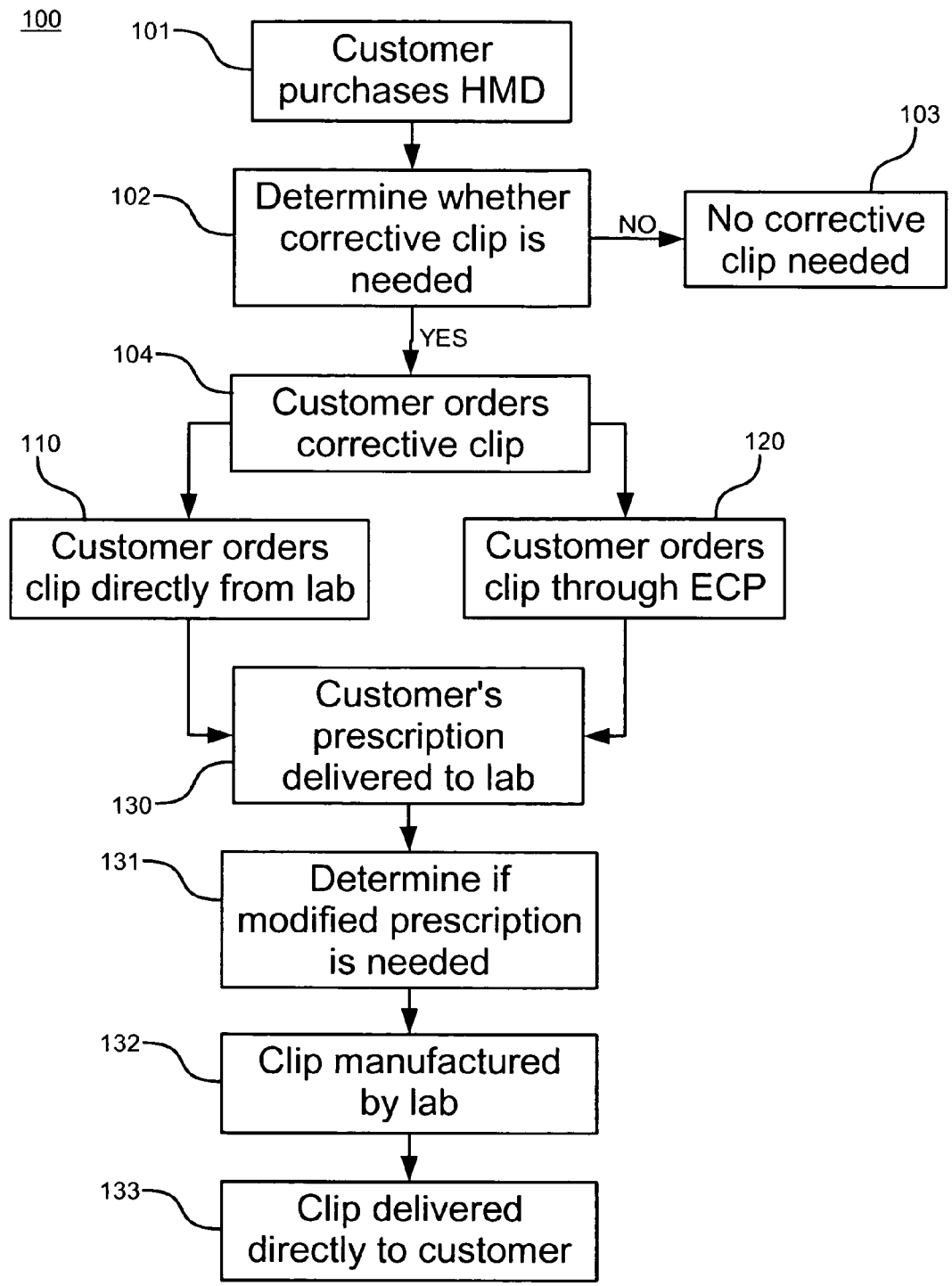
FIG. 1 is a block flow diagram of a corrective clip ordering method according to an aspect of the present invention.

Referring now to the Figures, FIG. 1 is a block flow diagram of a corrective clip ordering method 100 according to an aspect of the present invention At the outset, it should be noted that HMDs frequently have some ability to adjust the focus of their displays. However, this ability is usually quite limited, and the HMDs may only able to adjust the focus of the display to account for very small corrections. This may be advantageously applied to the present method, as a reduced lens series may be used for the corrective clip, wherein the lens series increments the corrective power of each successive lens in larger increments. A customer may receive a lens very close the required prescription and then use the focusing ability of the HMD to fine tune the display.

The method 100 starts when a customer purchases an HMD in block 101. The customer may determine on their own whether a corrective clip is needed in block 102. This step may be conducted with the aid of computer software, either on a website, or built into the HMD, or with the assistance of a vision test card, which may be optionally included with the HMD at purchase. Other methods typically used to determine vision deficiencies may be employed for determining whether the customer's lens prescription (Rx) is low enough to permit uncorrected HMD use without blurriness or without fatigue.

Alternatively, the customer may determine in conjunction with a lens provider or eye care professional (ECP), whether a corrective clip is needed at all, even if the customer normally requires a prescription. For example, if a particular HMD is able to focus the display to a small degree, consumers using a low power prescription may be able to use the focusability of the HMD to provide an acceptably clear image. In one useful embodiment, an HMD may be designed such that the HMD may be viewed without correction by users having for single vision (SV) prescriptions from 0 to +1.25 diopters with up to a 0.50 near addition. Likewise, the HMD may be viewed without correction by users having SV prescriptions from 0 to −1.25 diopters with up to a 0.5 near addition. Should a consumer's prescription fall within the non prescription viewing envelope allowable by an HMD, no corrective clip would be necessary (step 103). Additionally, a consumer may not need a corrective clip if the consumer chooses to wear contacts while using the HMD.

Furthermore, it is frequently the case that a consumer may have a different prescription for each eye. Where one eye may require correction, and the other does not, a corrective clip may still be required in order to allow a consumer to comfortably view an HMD video display with both eyes.

Should a corrective clip be needed, the customer would then order a corrective clip in step 104. The customer may order the corrective clip directly from a lab in block 110. This direct ordering in block 110 may take the form of ordering over a website, over the phone, or any other direct ordering method known or as yet undiscovered. In one preferred embodiment, a customer may order the corrective clip on a website, enter their delivery information, and either input their normal ECP information, after which the lab may get the required prescription information directly from the ECP, or the consumer may input their prescription information directly into the website. Non-presbyope customers must provide their SV Rx to order directly. Presbyope customers must provide their far vision Rx, their PD and their near power add, if any, to order directly. Alternatively, the customer may order a corrective clip through an ECP in block 120. The ECP is useful in assisting customers to determine their Rx, to update an old Rx, or to facilitate corrective clip ordering.

Once ordered, the required prescription is then delivered, in block 130, to a lab capable of manufacturing the corrective clip. This delivery may be electronic, such as a database, website or proprietary order system, on paper ordering forms, or any other system, all of which are known to skilled artisans. While the Rx used in the clip will be discussed in greater detail below, the lens holding frame is made of resilient material, preferably having a tensile strength of 400 to 700 N/mm$^2$ and the frame holds two lenses, one of which at least being a correction lens. Advantageously, the resilient material includes stainless steel. The lens holding frame may be moulded in a unitary piece. According to an embodiment, the lens holding frame is rimless. According to another embodiment, the lens holding frame includes half rims welded on each side the nose bridge. According to still another embodiment, the lens holding frame includes one full rim including the nose bridge and two parts extending from each side of the nose bridge, parts to which the lenses are attached. Typically, the lens holding frame lack temples. The connecting means are such that the lens holding frame may be adjusted onto the HMD device in a secure, reproducible and releasable position.

After delivery of the prescription and order, the lab determines whether a modified clip prescription is needed in block 131. This modification may account for the unique geometry of the HMD in relation to the user's face. The modification is discussed in greater detail below.

Based on the original or modified clip prescription calculated in block 131, the clip is manufactured by a lab in block 132, and then delivered, in block 133, directly to the customer. The direct delivery is made possible because the corrective clip mounts onto the HMD, not onto the users nose and ears. Therefore, the traditional practice of having an optometrist "fitting" spectacles onto a patient is not required. In addition, a standard frame that fits to the viewer can be uniformly used since we are correcting to a small field, at a known and fixed distance.

Figure 2:
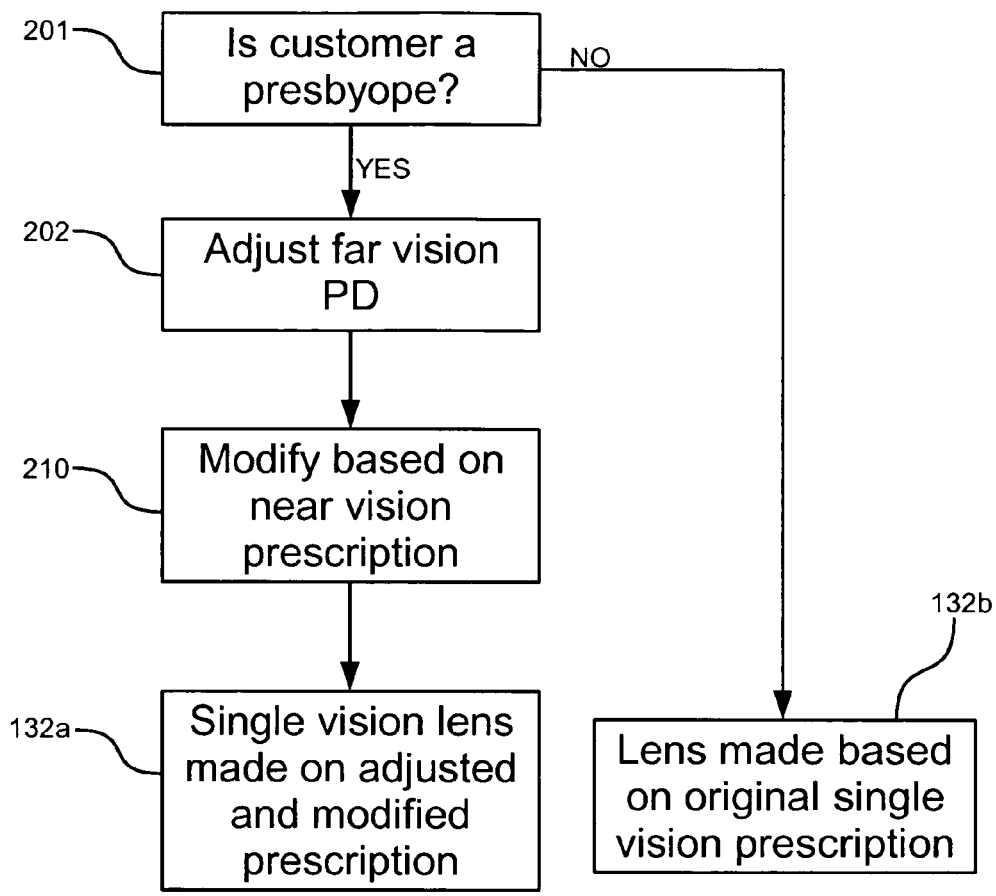
FIG. 2 is a block flow diagram of a corrective clip prescription correction according to an aspect of the present invention.

Referring now to FIG. 2, a method is illustrated for modifying a corrective clip prescription 131 according to an aspect of the present invention. Initially, it is determined in block 201 whether the customer is a presbyope. Presbyopes require vision correction in both the near and far fields.

Corrective Clip for Non-Presbyopes

If the customer is a non-presbyope in block 201, then the original SV and PD prescription is used for the manufacture of the corrective clip in block 132*b*.

Corrective Clip for Presbyopes

I. PD Adjustment. If the customer is a presbyope in block 201, the prescription is initially adjusted for pupillary distance (PD) in block 202. Adjustment of the PD involves multiplying PD by a predetermined factor to correct the far distance for mid distance vision.

The far vision PD is the distance between the customer's eyes. Lenses are generally edged to place the optical center in a position for a variety of viewing distances. The lens of the corrective clip sits at a fixed distance from the HMD which gives the appearance of a display several feet in front of the viewer while actually being mere inches from the viewer's eye. Because the image is virtually displayed three feet in front of the wearer's eyes, it induces a natural convergence of the eyes, thus an adjustment of the far distance PD is necessary to account for this convergence.

Technically, the virtual image is displayed by an optical system in which the optical path is inside a refractive optical polymer instead of free space. By being in a rigid form, alignment of the component surfaces is maintained, the intrusion of dust and moisture is prevented, and the optical path length is folded to move the display and back light away from the eyes.

Since the viewing distance is fixed, PD can be adjusted to one optimal setting. In a corrective clip for an HMD, the optical centers are moved inward slightly to provide optimal geometry for the fixed distance HMD display optics and corrective clip in relation to the user's eye. In one useful embodiment, the far vision PD may be multiplied by a factor between 0.8 and 0.99, for example a factor of 0.973, to obtain the mid distance PD. This calculation results in an adjusted PD value.

II. Near Vision Modification. The customer's prescription is also modified based on the customer's near vision prescription in block 210. This near vision prescription is usually characterized as the addition of a specified diopter amount to the SV (far distance) portion. With standard eyeglasses, nearsightedness is generally corrected with bifocals, with a top area for distance vision and a bottom area reserved for reading. However, by combining the near vision add with the far distance Rx, and the PD correction, a single vision lens may be used in the corrective clip.

In one preferred embodiment of the present principles, an additional additive factor is added to the previously adjusted prescription. The additive factor may be a fraction of the near vision corrective prescription. Additionally, the additive factor may be incremented in fewer, and larger, increments than standard prescriptions to take advantage of the focusability of the HMD. For example, near adds up to 0.75 diopters may be ignored. Near adds between 1.00 diopters and 1.25 may be compensated by adding 0.25 diopters to the SV portion. Near adds between 1.50 diopters and 1.75 may be compensated by adding 0.50 diopters to the SV portion. Near adds between 2.00 diopters and 2.25 may be compensated by adding 0.75 diopters to the SV portion. Near adds over 2.50 diopters may be compensated by adding 1.00 diopters to the SV portion. In other words, the modification may be described as a discrete averaging operation. A range of near adds is reduced to a discrete add, generally lower than the smallest near add of the range. The discrete add is combined with the SV to obtain a corrected SV. The corrected SV is larger than the SV, but smaller than the sum of the SV and the near add.

After final adjustment and modification of presbyope prescriptions for SV and PD, the calculated values can then be used to select appropriate lenses and edge them for the corrective clip in step 132a. In HMD applications, the corrective clip frame can be a standard size and shape, since its relationship to the HMD is more critical than the relationship to the users head, as is the case with standard eyeglasses. The corrective clip frame can be uniformly "fitted" to mount on a bridge portion of the HMD, with flexible arms to grasp the HMD in a secure, and releasable manner.

Accordingly we provide a corrective clip that can be mounted onto a head worn device, for example, a MicroOptical MyVu personal media viewer. Information on ordering the corrective clip is packaged with the viewer and automatically delivered to viewer purchasers. Several options are provided for users to determine if a corrective clip is right for them. Users possessing SV and PD data can place orders directly. Alternatively, we provide information for user to locate an ECP by zip code or other location based means. Orders are delivered to a lab where the corrective clip is manufactured. In contrast to ordering eyeglasses or prescription sunglasses, no frame data is needed. The corrective clip includes a nose bridge that rests on the nose pad of the HMD. Instead of ear-engaging temples, the corrective clip includes small L-shaped arms that extend down from the frame, and then away from the user's cheeks. The nose bridge of the corrective clip is made from a resilient material that allows the outer portions of the frame to pivot downwardly, using the nose pad as a fulcrum point. When pivoted downwardly, the free end of the arms clear the bottom of the viewer, and can engage an underside thereof. The upwardly biasing force of the nose bridge causes the arms to press against the underside of the viewer with a light force. The arms can be easily removed.

Surprisingly, this flexing ability of the corrective clip allows it to be repeatedly removed, and then placed back onto the viewer in the exact same location. The location comprises positioning the corrective clip within 1 inch of the display screen, and also within 2 to 6 feet of the virtual focus image location. In use the corrective clip resides between the user's eyes and a 20 to 30 inch virtual binocular image, without contacting the user. Since the media viewer is designed to allow some peripheral vision outside the device, the corrective clip is correspondingly short, for example, having a height boxing value B/2 of only 8.5 mm. Each lens may be 30 to 50 mm wide, for example, 33.5 mm. The distance between lenses may be between 30 and 35 mm, for example, 32 mm.

Although illustrative embodiments of the present invention have been described herein, it is to be understood that the present invention is not limited to those precise embodiments, and that various other changes and modifications may be affected therein by one skilled in the art without departing from the scope or spirit of the present invention. All such changes and modifications are intended to be included within the scope of the invention as defined by the appended claims. For example, it is expressly intended that switched steps that result in substantially the same actions to achieve the same results are within the scope of the invention. Moreover, it should be recognized that any disclosed form or embodiment of the invention may be incorporated in any other disclosed or described or suggested form or as a general matter of compatibility of application method. It is the intention, therefore, to be limited only as indicated by the scope of the claims appended hereto.

What is claimed is:

1. A method for ordering a corrective clip having corrective lenses, the corrective clip adapted for correcting a wearer's view of a head mounted display (HMD) for video, the method comprising:
   providing corrective clip ordering information to head mounted display (HMD) purchasers;
   ordering a corrective clip by providing at least one set of single vision (SV) and pupillary distance (PD) data:
   delivering the order for the corrective clip to a lab capable of manufacturing the corrective clip;
   manufacturing the corrective clip for mounting onto a head mounted display (HMD) including determining whether a customer is a presbyope, and upon determining that a customer is a presbyope:
      (i) raising the single vision (SV) prescription to a higher power based on the near vision add to provide a modified single vision (SV) prescription;
      (ii) calculating an adjusted pupillary distance (PD) by multiplying the far vision papillary distance (PD) by a factor less than 1; and
      (iii) providing a modified and adjusted single vision (SV) lens in the corrective clip; and
   delivering the corrective clip directly to a customer.

2. The method of claim 1, further comprising the step of determining whether a customer needs a corrective clip.

3. The method of claim 1, wherein the ordering comprises ordering the corrective clip through a website.

4. The method of claim 1, wherein the ordering comprises ordering the corrective clip over the phone from a lab capable of producing the corrective clip.

5. The method of claim 1, wherein the ordering comprises obtaining single vision (SV) and pupillary distance (PD) data from an eye care professional (ECP) and ordering the corrective clip through an eye care professional (ECP).

6. The method of claim 1, wherein the factor is 0.973.

7. The method of claim 6, the modification of the single vision (SV) prescription comprising discrete averaging based on the near vision add.

8. The method according to claim 1, wherein upon determining that the customer is not a presbyope, using the customer's normal single vision prescription as the prescription for the lens in the corrective clip.

9. The method according to claim 1, wherein said manufacturing step comprises edging a lens to fit into a standard clip which comprises a flexible nose bridge and arms and which omits temples; and wherein following said delivery step, the clip is adapted for mounting onto the viewer by flexing the nose bridge, and in use the clip does not contact the user.

10. The method of claim 9, wherein the clip is adapted to be positioned between a user's eyes and a head mounted display (HMD) display having a virtual focus image location between 2 and 6 feet from the user's eyes.

* * * * *